(12) United States Patent
Son

(10) Patent No.: US 9,926,889 B2
(45) Date of Patent: Mar. 27, 2018

(54) EXHAUST HEAT RECOVERY SYSTEM

(71) Applicant: Hyundai Motor Company, Seoul (KR)

(72) Inventor: You Sang Son, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 14/872,903

(22) Filed: Oct. 1, 2015

(65) Prior Publication Data

US 2016/0138532 A1    May 19, 2016

(30) Foreign Application Priority Data

Nov. 18, 2014 (KR) .......................... 10-2014-0161140

(51) Int. Cl.
| | |
|---|---|
| F02G 3/00 | (2006.01) |
| F02B 33/44 | (2006.01) |
| F02M 26/04 | (2016.01) |
| F02M 26/30 | (2016.01) |
| F01N 5/02 | (2006.01) |
| F02M 26/05 | (2016.01) |
| F02G 5/02 | (2006.01) |

(52) U.S. Cl.
CPC .............. F02M 26/04 (2016.02); F01N 5/02 (2013.01); F02M 26/05 (2016.02); F02M 26/30 (2016.02); *F02G 5/02* (2013.01); *Y02T 10/16* (2013.01); *Y02T 10/166* (2013.01)

(58) Field of Classification Search
CPC .. F02G 5/02; F02G 5/04; F02M 26/04; F02M 26/05; F01N 5/02
USPC ............................ 60/618, 605.2; 123/568.11
See application file for complete search history.

(56) References Cited

U.S. PATENT DOCUMENTS

| | | |
|---|---|---|
| 4,974,667 A | 12/1990 | Sun |
| 5,649,425 A | 7/1997 | Matsumura et al. |
| 6,052,996 A | 4/2000 | Clark |
| 6,782,709 B2 | 8/2004 | Panin et al. |
| 8,020,524 B2 | 9/2011 | Miyagawa |
| 2007/0163261 A1 | 7/2007 | Strathman |
| 2007/0235164 A1 | 10/2007 | Miyagawa |
| 2009/0211253 A1* | 8/2009 | Radcliff ................ F01K 23/065 60/670 |
| 2010/0018207 A1 | 1/2010 | Juchymenko |
| 2011/0278846 A1 | 11/2011 | Landi et al. |
| 2012/0047892 A1 | 3/2012 | Held |

(Continued)

FOREIGN PATENT DOCUMENTS

| | | |
|---|---|---|
| JP | S 59-5814 A | 1/1984 |
| JP | H 09-88514 A | 3/1997 |
| JP | 2003-089036 (A) | 3/2003 |
| JP | 2003-097361 A | 4/2003 |
| JP | 2005-330863 A | 12/2005 |
| JP | 2007-107389 A | 4/2007 |
| JP | 2008-185001 (A) | 8/2008 |
| JP | 2008-232031 A | 10/2008 |
| JP | 2009-138615 A | 6/2009 |
| JP | 2010-249424 A | 11/2010 |
| JP | 2011-241830 A | 12/2011 |

(Continued)

*Primary Examiner* — Ngoc T Nguyen
(74) *Attorney, Agent, or Firm* — Morgan, Lewis & Bockius

(57) ABSTRACT

An exhaust heat recovery system may include an exhaust pipe through which exhaust gas exhausted from an engine moves, a main channel through which a working fluid moves, a turbine rotated by the working fluid exhausted from the main channel to generate energy, an exhaust gas recirculation (EGR) line circulating a portion of the exhaust gas exhausted from the engine to an intake manifold, and channel control valves disposed in the main channel and configured to control movement of the working fluid so that the exhaust gas moving along the EGR line and the working fluid moving along the main channel exchange heat with each other.

6 Claims, 21 Drawing Sheets

(56) References Cited

U.S. PATENT DOCUMENTS

| | | | |
|---|---|---|---|
| 2012/0192560 A1* | 8/2012 | Ernst | F02M 25/0735 |
| | | | 60/616 |
| 2012/0204558 A1* | 8/2012 | Stegmaier | F01N 5/02 |
| | | | 60/605.2 |
| 2013/0036736 A1 | 2/2013 | Hart | |
| 2013/0199178 A1 | 8/2013 | Kanou et al. | |
| 2014/0013743 A1 | 1/2014 | Dane | |
| 2014/0116050 A1 | 5/2014 | Seo | |
| 2015/0176465 A1* | 6/2015 | Son | F02G 5/04 |
| | | | 60/597 |
| 2015/0176466 A1* | 6/2015 | Son | F02G 5/04 |
| | | | 60/624 |
| 2016/0138532 A1 | 5/2016 | Son | |
| 2017/0002695 A1 | 1/2017 | Kim | |

FOREIGN PATENT DOCUMENTS

| | | |
|---|---|---|
| JP | 2012-007500 A | 1/2012 |
| JP | 2013-249791 A | 12/2013 |
| JP | 2014-043790 A | 3/2014 |
| KR | 10-1995-0033062 A | 12/1995 |
| KR | 2003-0047251 A | 6/2003 |
| KR | 10-2005-0023486 A | 3/2005 |
| KR | 10-2009-0093465 A | 9/2009 |
| KR | 10-2013-0032002 A | 4/2013 |
| KR | 2013-0069820 A | 6/2013 |
| KR | 2014-0055074 A | 5/2014 |
| KR | 10-1610542 B1 | 4/2016 |

\* cited by examiner

EXHAUST HEAT RECOVERY SYSTEM

CROSS-REFERENCE TO RELATED APPLICATION

The present application claims priority to Korean Patent Application No. 10-2014-0161140, filed Nov. 18, 2014, the entire contents of which is incorporated herein for all purposes by this reference.

BACKGROUND OF THE INVENTION

Field of the Invention

The present invention relates to a method of controlling a turbine of an exhaust heat recovery system, and more particularly, to a method of controlling a turbine of an exhaust heat recovery system capable of preventing damage to the turbine that may occur due to a liquid-phase working fluid remaining in the turbine.

Description of Related Art

An internal combustion engine has been widely used in a vehicle, a ship, a small generator, and the like, and an attempt to improve efficiency of the internal combustion engine has been continuously conducted. In the internal combustion engine, a large quantity of heat is generally exhausted as exhaust heat, and several systems for increasing overall efficiency of the internal combustion engine by recovering the exhaust heat that has been developed.

When considering apparatuses and components required for configuring an exhaust heat recovery system, an increase in a load, and the like, it is more efficient to mount an exhaust heat recycling system in a large vehicle that has a large displacement and may carry many persons or cargos than to mount the exhaust heat recycling system in a small vehicle that has a small displacement and is light.

In the case of a vehicle, a typical example of a system of recycling the exhaust heat includes a system using a turbo compound and a system using a thermoelectric element.

The system using a turbo compound uses a scheme of obtaining an output by attaching an exhaust turbine to an exhaust line and rotating the exhaust turbine by an exhaust pressure. In this scheme, thermal efficiency of an entire system in which the internal combustion engine is installed may be improved; however, the exhaust turbine is operated as an exhaust resistor, such that an output of an engine itself is decreased.

The system using a thermoelectric element uses a scheme of charging electricity using the thermoelectric element generating the electricity by a temperature difference or driving an auxiliary motor by the electricity to assist the engine. However, a cost of the thermoelectric element itself may not be ignored, and a space in which the thermoelectric element may be mounted is narrow, such that even though the thermoelectric element is actually mounted in mass-produced vehicles, it is not easy to meaningfully improve thermal efficiency of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust heat recovery system capable of efficiently recovering exhaust heat of an internal combustion engine.

According to various aspects of the present invention, an exhaust heat recovery system may include an exhaust pipe through which exhaust gas exhausted from an engine moves, a main channel through which a working fluid moves, a turbine rotated by the working fluid exhausted from the main channel to generate energy, an exhaust gas recirculation (EGR) line circulating a portion of the exhaust gas exhausted from the engine to an intake manifold, and channel control valves disposed in the main channel and configured to control movement of the working fluid so that the exhaust gas moving along the EGR line and the working fluid moving along the main channel exchange heat with each other.

The exhaust heat recovery system may further include a reservoir storing a liquid-phase working fluid therein, a heat exchanger provided in the exhaust pipe so as to receive the liquid-phase working fluid from the reservoir and evaporate the liquid-state working fluid, and a super heater connected to an EGR cooler so as to receive the evaporated working fluid from the heat exchanger depending on operations of the channel control valves and transferring heat of the exhaust gas circulated to the intake manifold to the evaporated working fluid to heat the evaporated working fluid.

The working fluid supplied from the reservoir to the heat exchanger may be pressurized through a pump.

The turbine selectively may receive the working fluid from the heat exchanger or the super heater depending on the operations of the channel control valves.

The main channel may be branched into a first branch channel connected to a super heater inlet formed in the super heater and a second branch channel extended toward the turbine, and the second branch channel may be branched into a third branch channel connected to a super heater outlet formed in the super heater and a fourth branch channel connected to a turbine inlet formed in the turbine.

The channel control valves may be provided at a first branch point at which the main channel is branched into the first branch channel and the second branch channel and a second branch point at which the second branch channel is branched into the third branch channel and the fourth branch channel, respectively.

The channel control valves may include a first channel control valve provided at a first branch point at which the main channel is branched into the first branch channel and the second branch channel, and a second channel control valve provided at a second branch point at which the second branch channel is branched into the third branch channel and the fourth branch channel.

The exhaust heat recovery system may further include a post-processing apparatus disposed in the exhaust pipe and configured to filter a particulate matter (PM) exhausted from the engine.

The exhaust heat recovery system according may further include a Thermoelectric Generator (TEG) condenser configured to condense the working fluid exhausted from the turbine, and a recuperator configured to absorb thermal energy from the working fluid moving from the turbine to the TEG condenser and transfer the thermal energy to the working fluid injected from the reservoir to the heat exchanger.

According to various aspects of the present invention, an exhaust heat recovery system may include a main channel into which an evaporated working fluid is introduced, a plurality of branch channels branched from the main channel, a super heater disposed in at least one of the plurality of branch channels and configured to supply thermal energy to a moving working fluid, and a turbine rotated by the working fluid supplied from the plurality of branch channels to generate energy.

The exhaust heat recovery system may further include a channel control valve configured to open at least one of the plurality of branch channels to adjust a flow of the working fluid.

The main channel may be connected to a heat exchanger provided in an exhaust pipe and recovering heat from exhaust gas to evaporate a liquid-phase working fluid.

The turbine may be connected to a reservoir pressuring the working fluid and supplying the pressurized working fluid to the heat exchanger.

A recuperator configured to induce heat exchange between the working fluid introduced into the reservoir and a working fluid exhausted from the reservoir and a TEG condenser configured to condense the working fluid introduced into the reservoir may be provided between the turbine and the reservoir.

According to various aspects of the present invention, a method of operating an exhaust heat recovery system including a main channel into which a working fluid evaporated through a heat exchanger provided in an exhaust pipe is introduced and a super heater and a turbine that are in selective communication with the main channel through channel control valves provided in the main channel, the super heater heating the working fluid and the turbine generating electric power using the working fluid or the working fluid heated through the super heater, may include driving an engine, and operating the channel control valves so that the main channel and the super heater exchange heat with each other when an EGR valve is operated.

When the main channel and the super heater are in communication with each other, an amount of the working fluid supplied by a pump compressing the working fluid from a reservoir in which the working fluid is stored and supplying the compressed working fluid to the heat exchanger may be increased.

When it is determined that the EGR valve is not operated, the channel control valves may be operated so that the main channel and the turbine are in communication with each other, and when the main channel and the turbine are in communication with each other, an amount of the working fluid supplied by a pump compressing the working fluid from a reservoir in which the working fluid is stored and supplying the compressed working fluid to the heat exchanger may be maintained.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
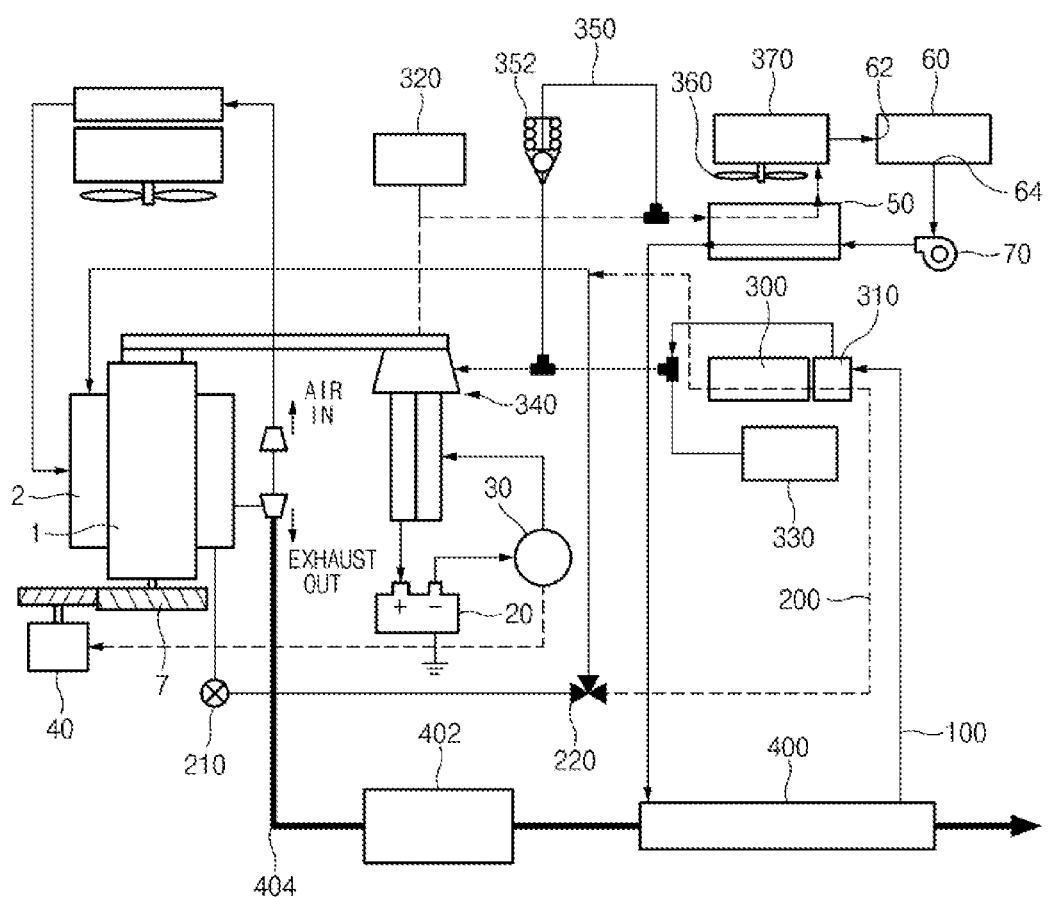
FIG. 1 is a schematic view of an exemplary exhaust heat recovery system according to the present invention.
Figure 2:
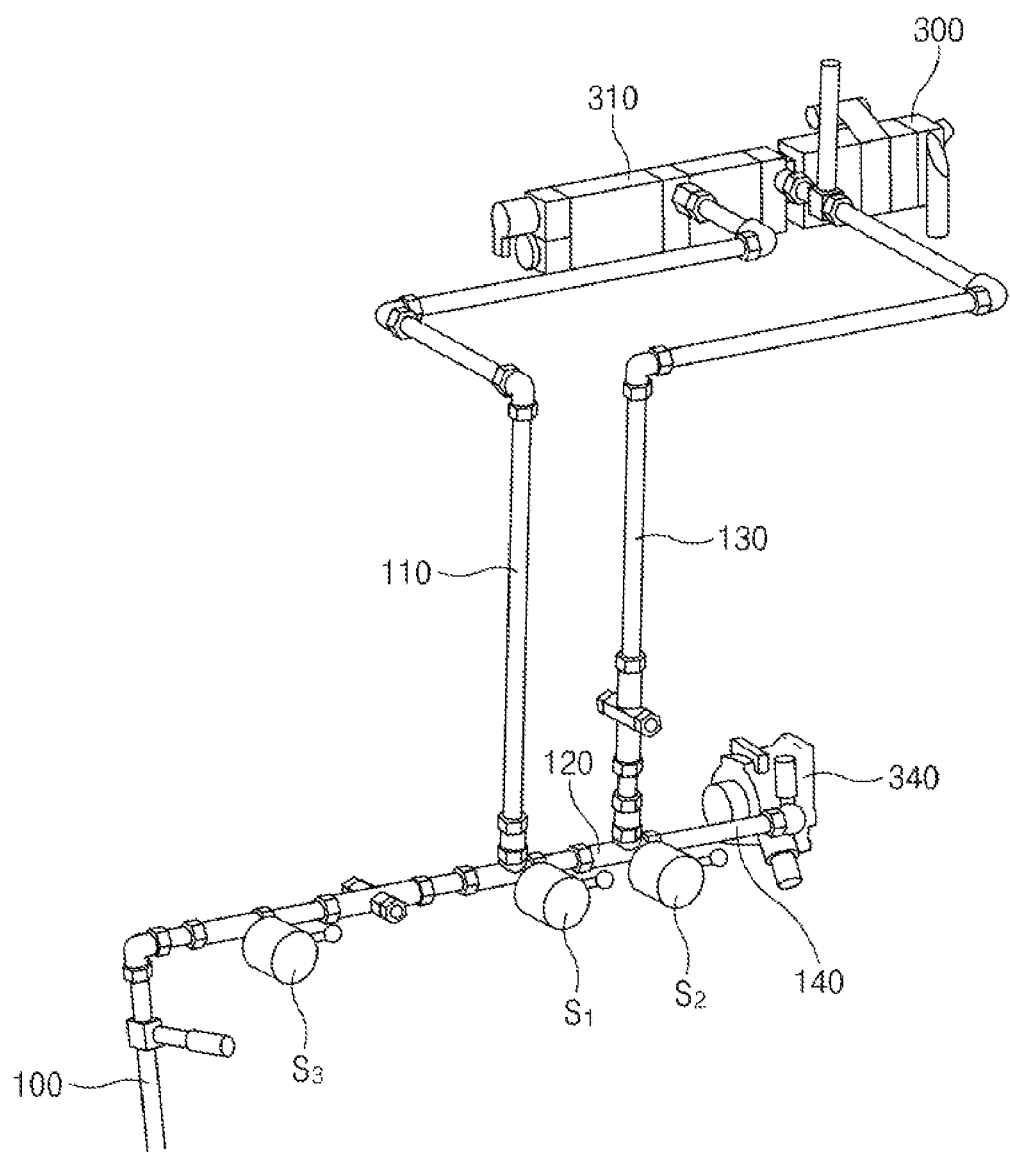
FIG. 2 is a perspective view of main parts of the exhaust heat recovery system of FIG. 1.

As illustrated in FIG. 1 and FIG. 2, an exhaust heat recovery system according to various embodiments of the present invention includes an exhaust pipe 404 through which exhaust gas exhausted from an engine moves, a main channel 100 through which a working fluid moves, a turbine 340 rotated by the working fluid exhausted from the main channel 100 to generate electrical energy and mechanical energy, an exhaust gas recirculation (EGR) line 200 circulating some of the exhaust gas exhausted from the engine to an intake manifold 2, and channel control valves $S_1$ and $S_2$ disposed in the main channel 100 and controlling movement of the working fluid so that the exhaust gas moving along the EGR line 200 and the working fluid moving along the main channel 100 exchange heat with each other.

In addition, the exhaust heat recovery system according to various embodiments of the present invention further includes a reservoir 60 storing a liquid-phase working fluid therein, a heat exchanger 400 provided in the exhaust pipe 404 so as to receive the liquid-phase working fluid from the reservoir 60 and evaporate the liquid-state working fluid, and a super heater 310 connected to an EGR cooler 300 so as to receive the evaporated working fluid from the heat exchanger 400 depending on operations of the channel control valves and transferring heat of the exhaust gas circulated to the intake manifold to the evaporated working fluid to heat the evaporated working fluid.

The working fluid supplied from the reservoir 60 to the heat exchanger 400 is pressurized through a pump 70. The turbine 340 selectively receives the working fluid from the heat exchanger 400 or the super heater 310 depending on the operations of the channel control valves $S_1$ and $S_2$.

A post-processing apparatus 402 filtering a particulate matter (PM) exhausted from the engine is disposed in the exhaust pipe 404. The exhaust heat recovery system further includes a Thermoelectric Generator (TEG) condenser 370 condensing the working fluid exhausted from the turbine 340 and a recuperator 50 absorbing thermal energy from the working fluid moving from the turbine 340 to the condenser 370 and transferring the thermal energy to the working fluid supplied from the reservoir 60 to the heat exchanger 400.

The super heater 310 is connected to the EGR cooler 300 and transfers heat of the exhaust gas introduced into the EGR cooler 300 to a gas-phase working fluid received through the heat exchanger 400. The turbine 340 is in selective communication with the super heater 310 or the heat exchanger 400 and receives a torque from the received gas-phase working fluid to generate electric power.

The main channel 100 is branched into a first branch channel 110 connected to a super heater inlet 315 formed in the super heater 310 and a second branch channel 120 extended toward the turbine 340, and the second branch channel 120 is branched into a third branch channel 130 connected to a super heater outlet formed in the super heater 310 and a fourth branch channel 140 connected to a turbine inlet formed in the turbine 340. Connection relationships between the main channel 100 and the branch channels 110, 120, 130, and 140 have been described based on a state in which a flow of the working fluid is excluded and the main channel 100 and the branch channels 110, 120, 130, and 140 are simply arranged.

The channel control valves $S_1$ and $S_2$ are provided at a first branch point at which the main channel 100 is branched into the first branch channel 110 and the second branch channel 120 and a second branch point at which the second branch channel 120 is branched into the third branch channel 130 and the fourth branch channel 140, respectively.

More accurately, the channel control valves $S_1$ and $S_2$ include a first channel control valve S1 provided at the first branch point at which the main channel 100 is branched into the first branch channel 110 and the second branch channel 120 and a second channel control valve $S_2$ provided at the second branch point at which the second branch channel 120 is branched into the third branch channel 130 and the fourth branch channel 140.

Figure 3:
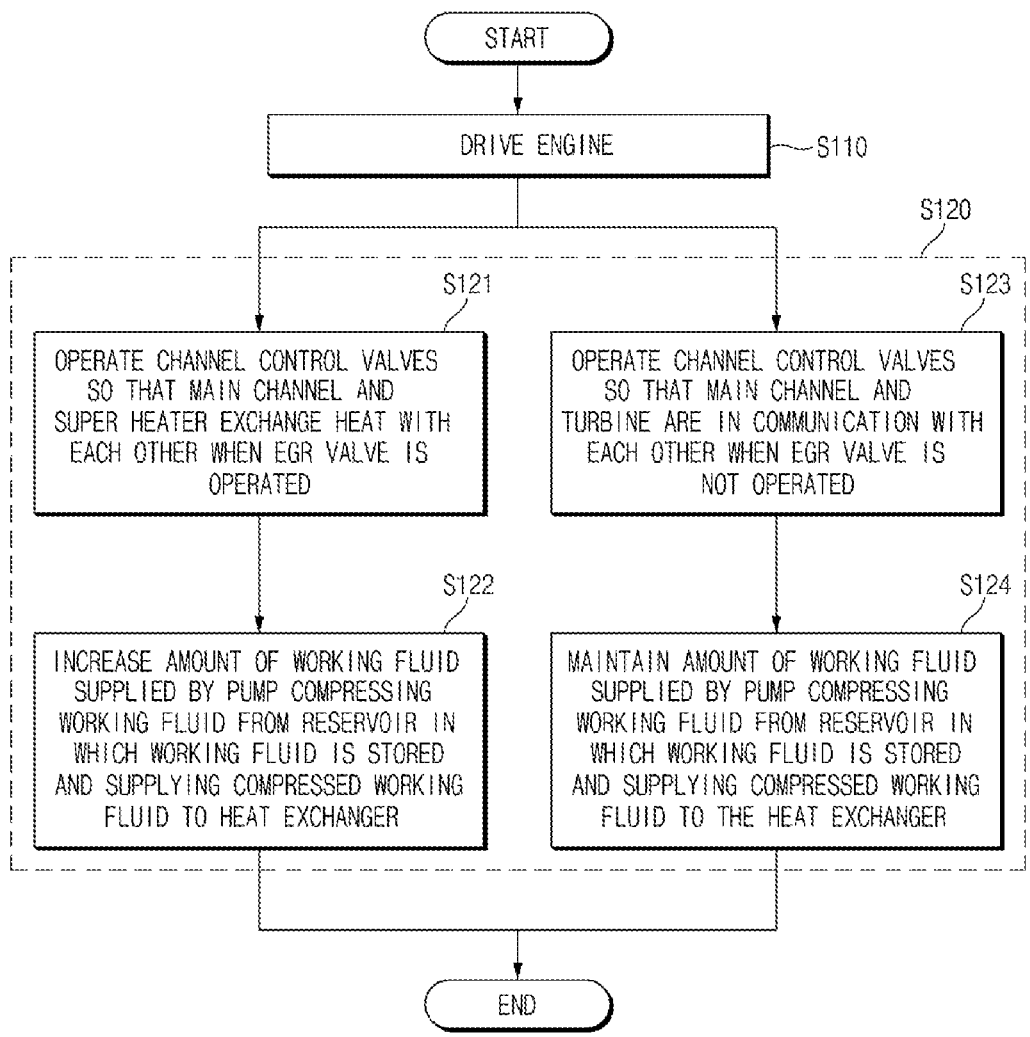
FIG. 3 is a procedure view of a method of operating the exhaust heat recovery system according to the exemplary embodiment of the present invention.
Figure 4:
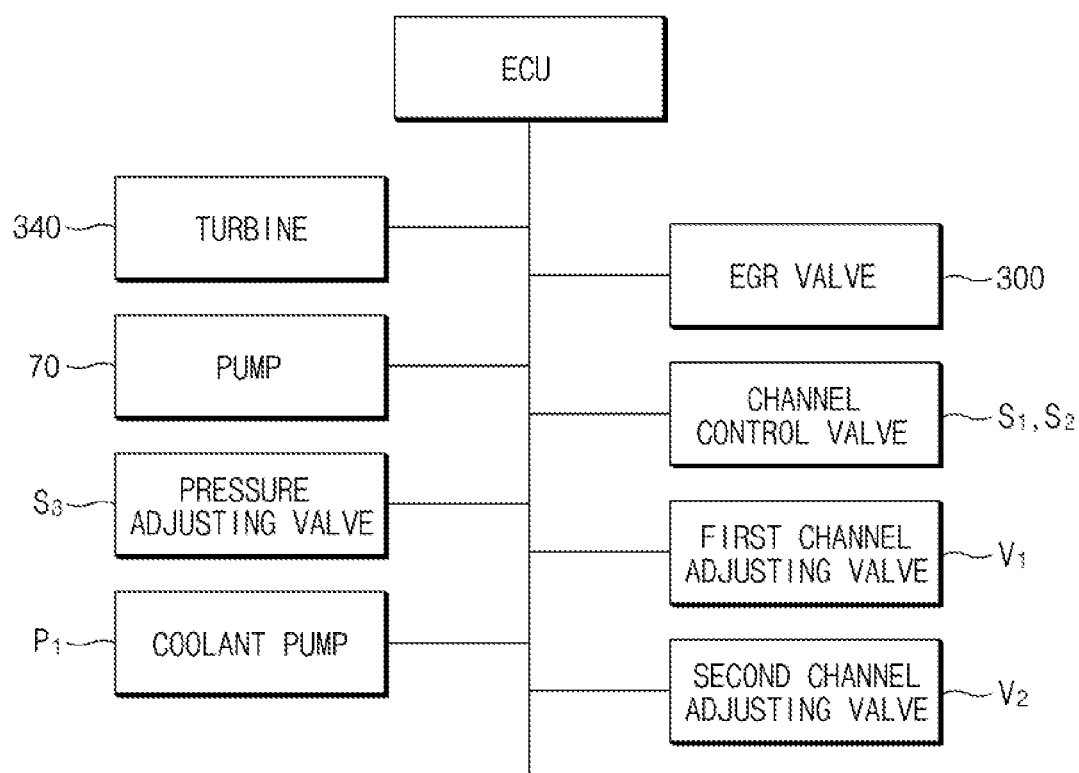
FIG. 4 is a control block diagram of the method of operating the exhaust heat recovery system of FIG. 3.

As illustrated in FIGS. 3 and 4, a method of operating the exhaust heat recovery system according to various embodiments of the present invention includes driving the engine (S110) and operating the channel control valves $S_1$ and $S_2$ so that the main channel 100 and the super heater 310 exchange heat with each other (S120) when the EGR valve 210 is operated.

When the engine 1 is driven and the EGR valve 210 is operated, the channel control valves are operated so that the main channel and the super heater 310 are in communication with each other (S121). When the main channel and the super heater 310 are in communication with each other, an amount of the working fluid supplied by the pump 70 compressing the working fluid from the reservoir 60 in which the working fluid is stored and supplying the compressed working fluid to the heat exchanger 400 is increased (S122).

When the EGR valve 210 is not operated, the channel control valves are operated so that the main channel and the turbine 340 are in communication with each other (S123), and an amount of the working fluid supplied by the pump 70 compressing the working fluid from the reservoir 60 in which the working fluid is stored and supplying the compressed working fluid to the heat exchanger 400 is maintained (S124).

Figure 5:
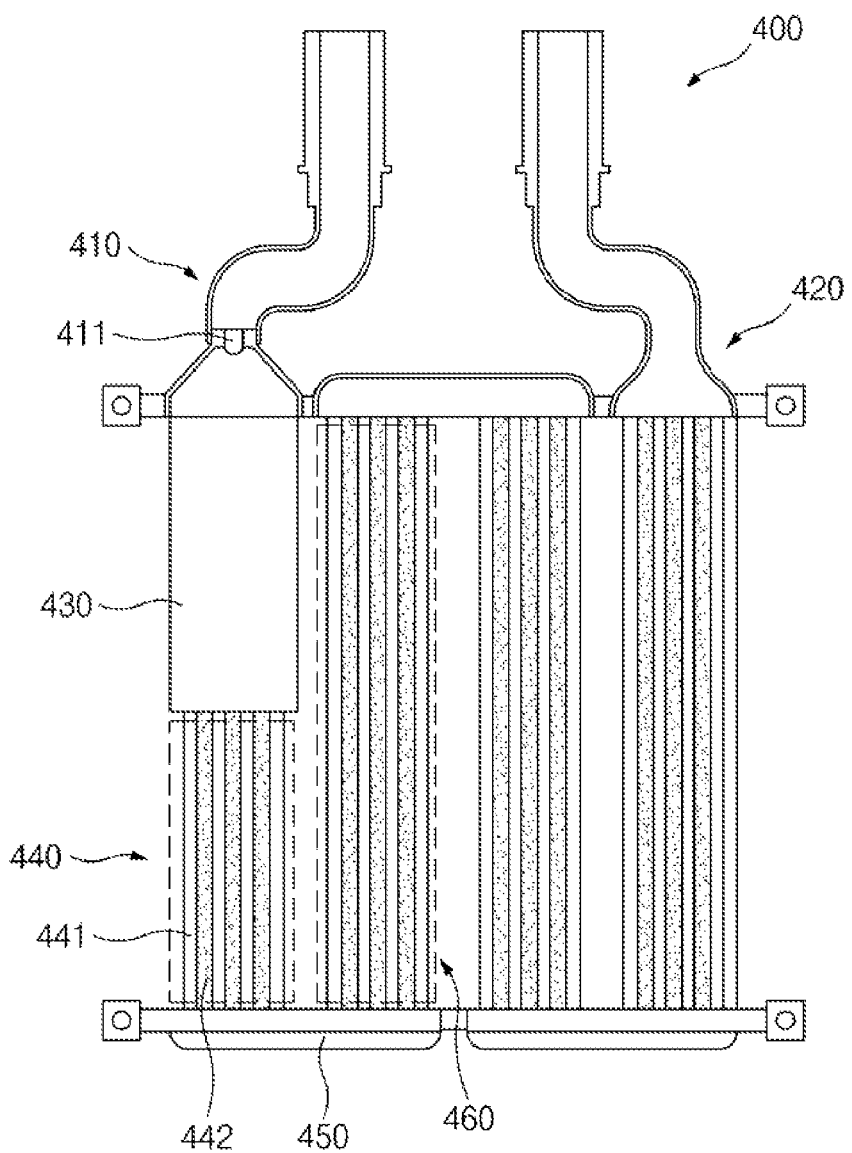
FIG. 5 is a cross-sectional view of a heat exchanger included in the exhaust heat recovery system of FIG. 1.
Figure 6:
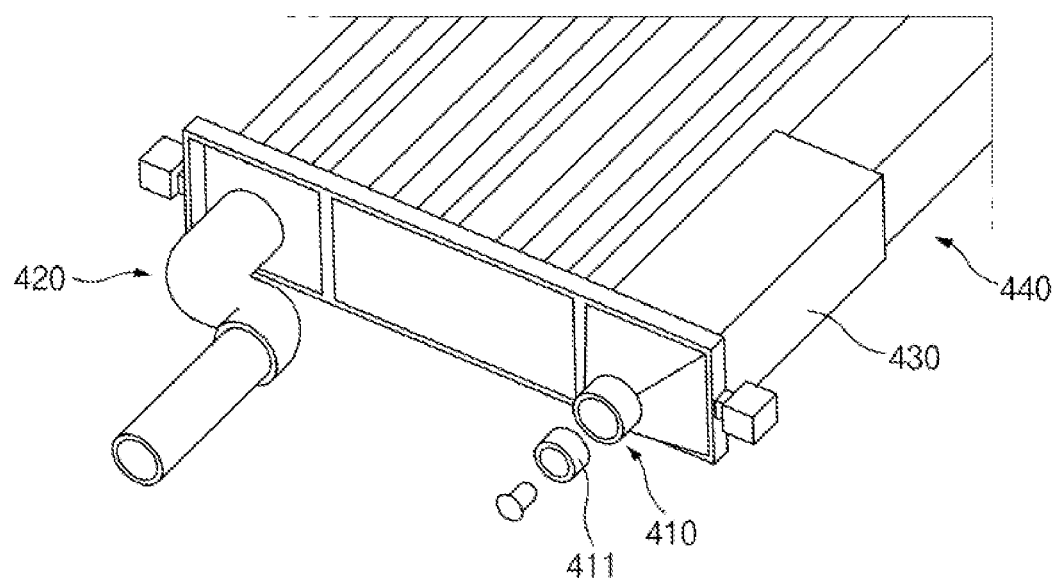
FIG. 6 is a perspective view of main parts of the heat exchanger of FIG. 5.
Figure 7:
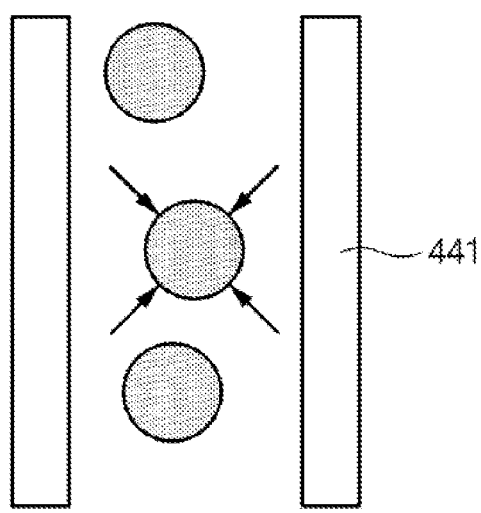
FIG. 7 is an illustrative view of a heat exchange form of the heat exchanger of FIG. 5.

As illustrated in FIGS. 5 to 7, the heat exchanger 400 according to various embodiments of the present invention, which is a heat exchanger 400 of the exhaust heat recovery system absorbing thermal energy from the exhaust pipe 404 and supplying the thermal energy to the working fluid so as to supply a gas-phase working fluid to the turbine 304 generating energy, includes a nozzle 411 atomizing the introduced working fluid.

In addition, the heat exchanger 400 includes a heat exchange path provided with a heat exchanger inlet 410 through which the liquid-phase working fluid is introduced and a heat exchanger outlet 420 through which the working fluid is evaporated and exhausted through the exhaust gas, and the nozzle 411 is provided in the heat exchanger inlet 410.

The heat exchange path is accommodated in a heat exchanger housing, which is attached to the post-processing apparatus 402 through which the exhaust gas moves. The heat exchange path includes a chamber 430 extended from the heat exchanger inlet and spraying the working fluid through the nozzle 411 so as to be atomized, a chamber extension tube 440 having a plurality of heat exchange lines 441 arranged at the same interval and attached to the chamber 430 so that the atomized working fluid is introduced into the heat exchange lines 441, and extension tubes 460 positioned at one side of the chamber extension tube 440, having a plurality of heat exchange lines 441 arranged at the same interval, and connected to each other through horizontal connection members 450 so that the working fluid is introduced from the chamber extension tube 440, wherein the extension tubes 460 are connected to the heat exchanger outlet 420.

A plurality of extension tubes 460 are provided at the same interval, and are connected to each other through a plurality of horizontal connection members 450 so that the heat exchanger inlet and the heat exchanger outlet are in communication with each other. Exhaust gas fins 442 contacting the exhaust gas are provided between the plurality of heat exchange lines 441, and working fluid fins contacting the working fluid are provided in the heat exchange lines 441.

The heat exchanger inlet is connected to the pump 70 pressuring and injecting the liquid-phase working fluid and a reservoir 60 supplying the working fluid to the pump 70, and the heat exchanger outlet is selectively connected to the turbine 340 to which the gas-phase working fluid is supplied from the heat exchanger outlet or the super heater 310. The main channel 100 connecting the heat exchanger outlet and the turbine 340 to each other is provided with the channel control valves blocking communication between the heat exchanger outlet and the turbine 340 and allowing the heat exchanger outlet and the super heater 310 to be in communication with each other.

Figure 8:
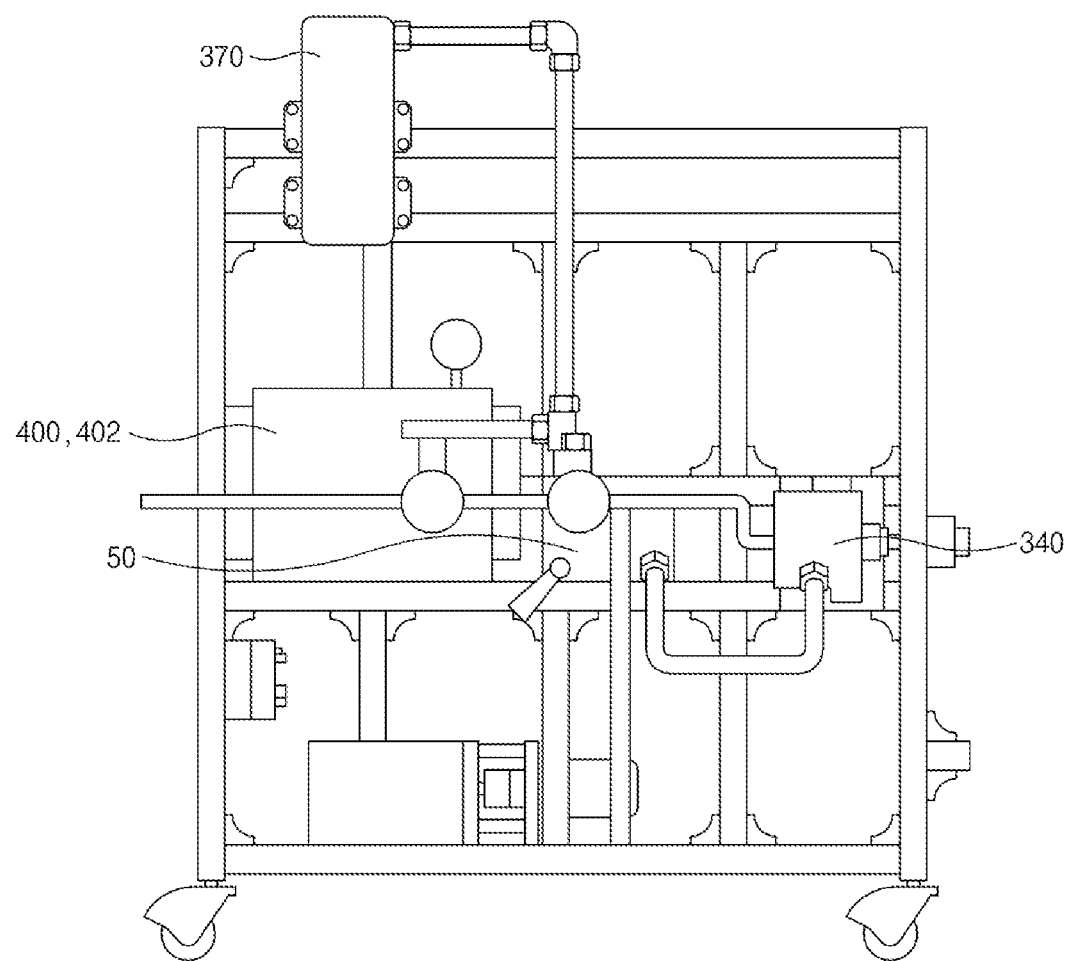
FIG. 8 is an illustrative view of mounting of a turbine in the exhaust heat recovery system of FIG. 1.
Figure 9:
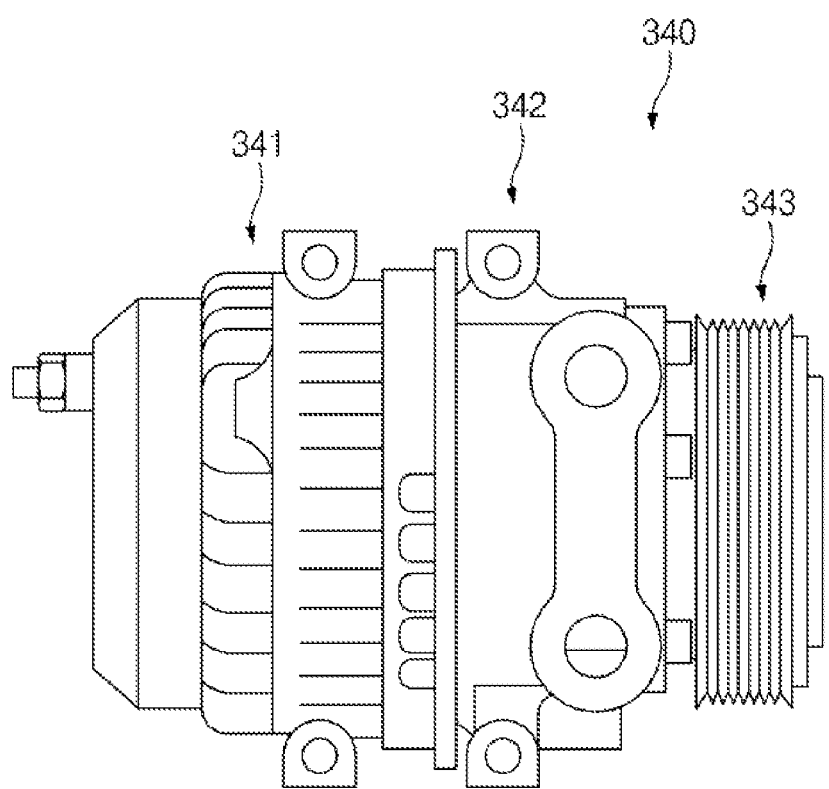
FIG. 9 is a perspective view of main parts of the turbine of FIG. 7.

As illustrated in FIG. 8 and FIG. 9, the turbine 340 includes a power generation turbine 342, a clutch, a motor generator 341, and a pulley 343.

Rotors of the power generation turbine 342 and the motor generators 341 are connected to each other on the same axis, and the clutch mechanically controls the power generation turbine 342 and the pulley 343.

The turbine 340 may drive a shaft installed in an internal combustion engine directly using rotation energy of the power generation turbine 342. Here, the shaft installed in the internal combustion engine may be a crankshaft of the engine 1 transferring power to a wheel, but is not necessarily limited thereto. The shaft installed in the internal combustion engine may be, for example, a shaft additionally mounted in the engine 1 and driving apparatuses operated using a torque, such as an air conditioner pump, a coolant pump, or the like. The rotation energy from the power generation turbine 342 may be transferred to the shaft through a belt. Here, a chain or a gear may be used instead of the belt.

Meanwhile, the motor generator 341 may convert the rotation energy of the power generation turbine 342 into electrical energy and mechanical energy, and the electrical energy converted as described above may be stored in a battery 20. In the case in which the clutch disconnects the power generation turbine 342 and the pulley 343 from each other, a torque of the power generation turbine 342 is used only to generate electric power, and in the case in which the clutch connects the power generation turbine 342 and the pulley 343 to each other, a torque of the power generation turbine 342 is used to apply power to the shaft installed in the internal combustion engine as well as to generate electric power. The motor generator 341 may receive electric power from the battery to drive the shaft installed in the internal combustion engine.

A power transferring part 40 may be installed in a gear train 7 of the engine 1 so as to be engaged with the gear train 7. The power transferring part 40 may receive the electric power from the battery 20 through an inverter 30 to thereby be used to start up the engine 1 or may serve as a driving source assisting the engine 1 to serve to raise an output of the engine 1 or lower a load of the engine 1, thereby improving fuel efficiency of the engine 1.

Meanwhile, the turbine 340 may further include a second clutch that may mechanically control the power generation turbine 342 and the motor generator 341. In the case in which the working fluid rotates the power generation turbine 342, when a period in which a torque of the power generation turbine 342 is converted into electrical energy is excessively long, the battery 20 may be over-charged.

In this case, the second clutch may mechanically disconnect the power generation turbine 342 and the motor generator 341 from each other, and the power generation turbine 342 continuously rotates in a state in which it is mechanically disconnected from the motor generator 341. In this case, rotation energy of the power generation turbine 342 may be maximally utilized without being wasted by allowing the power generation turbine 342 to drive the shaft 6 installed in the internal combustion engine without leaving the power generation turbine 342 idling.

When a voltage of the battery 20 drops up to a predetermined charging start reference voltage during a period in which the working fluid rotates the power generation turbine 342, a recycling system may be configured so that the second clutch may again mechanically connect the power generation turbine 342 and the motor generator 341 to charge the battery 20.

In the turbine 340 configured as described above, after start-up of a vehicle stops, the working fluid is not exhausted from the turbine 340, but remains in the turbine 340. The working fluid remaining in the turbine 340 is cooled, such that a phase thereof is changed from a gas phase into a liquid phase, and the liquid-phase working fluid and the gas-phase working fluid coexist in the turbine 340 at the time of again operating the engine 1, such that a cavitation phenomenon may occur and the power generation turbine 342 may be damaged due to the liquid-phase working fluid and air bubbles.

Figure 10:
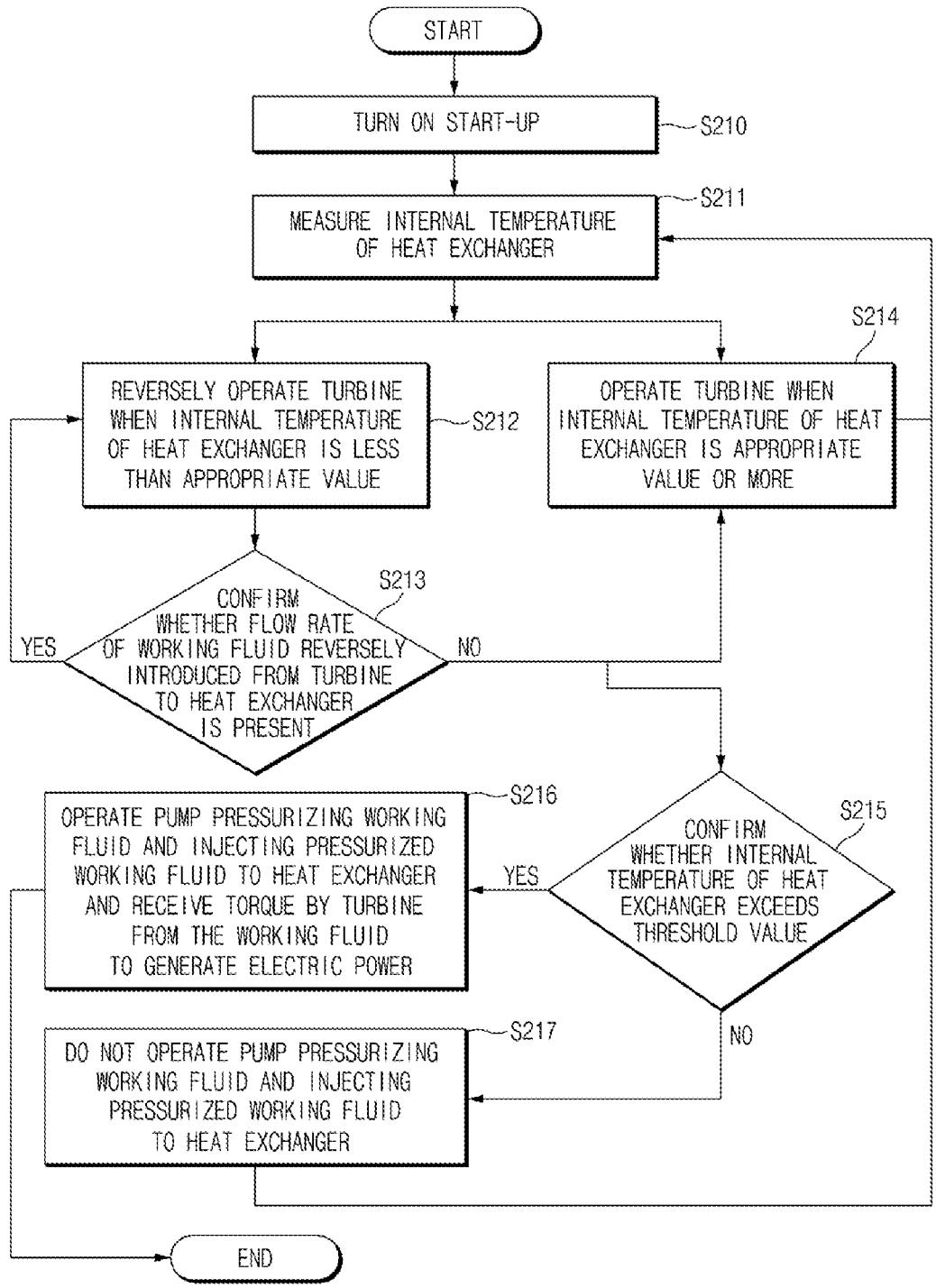
FIG. 10 is a procedure view of a method of controlling the turbine of the exemplary exhaust heat recovery system according to the present invention.

Therefore, according to a procedure view illustrated in FIG. 10, the exhaust heat recovery system according to various embodiments of the present invention controls the turbine 340 to forcibly rotate reversely the turbine 340 after starting up the engine 1, thereby reversely introducing the working fluid remaining in the turbine 340 into the heat exchanger 400.

A method of controlling the turbine of the exhaust heat recovery system will be described in more detail below. The method of controlling the turbine of the exhaust heat recovery system, which is a method of controlling the turbine of the exhaust heat recovery system in which the heat of the exhaust gas evaporates the working fluid through the heat exchanger 400 provided in the exhaust pipe 404 and the working fluid is supplied to the turbine 340, includes turning on start-up (S210), measuring an internal temperature of the heat exchanger 400 (S211), and rotating the turbine 340 in a reverse direction (S212) when the measured internal temperature is a predetermined temperature or less.

After the start-up, the internal temperature of the heat exchanger 400 is measured, and the turbine 340 is reversely operated when the measured value is less than an appropriate value (50° C.). When the measured value is the appropriate value or more, the turbine 340 is normally operated, and the internal temperature of the heat exchanger is again measured (S214).

When the turbine 340 is reversely operated, it is confirmed whether a flow rate of the working fluid reversely introduced from the turbine 340 to the heat exchanger 400 is present (S213). When the flow rate of the working fluid reversely introduced from the turbine 340 to the heat exchanger 400 is present, the reverse operation of the turbine 340 is continued. Then, it is confirmed whether the internal temperature of the heat exchanger 400 exceeds a threshold value (250° C.) (S215).

When the flow rate of the working fluid reversely introduced from the turbine 340 to the heat exchanger 400 is not present and the internal temperature of the heat exchanger 400 exceeds the threshold value (250° C.), the pump 70 pressurizing the working fluid and injecting the pressurized working fluid to the heat exchanger 400 is operated, and the turbine 340 receives a torque from the working fluid to generate electric power (S216).

When the flow rate of the working fluid reversely introduced from the turbine 340 to the heat exchanger 400 is not present and the internal temperature of the heat exchanger 400 is less than the threshold value, the pump 70 pressurizing the working fluid and injecting the pressurized working fluid to the heat exchanger 400 is not operated (S217).

Figure 11:
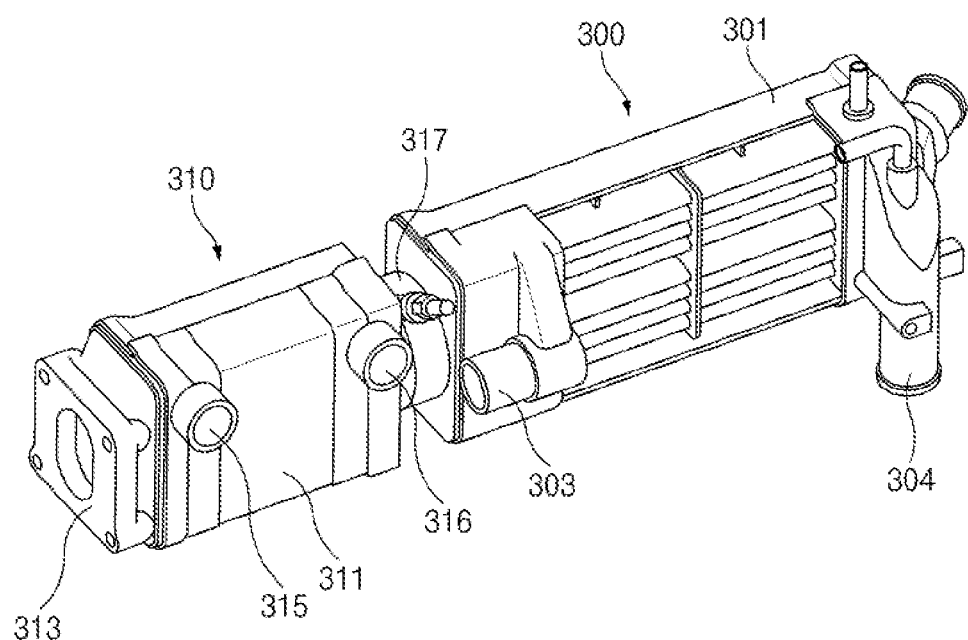
FIG. 11 is a perspective view of a super heater and an exhaust gas recirculation (EGR) cooler included in the exemplary exhaust heat recovery system of FIG. 1.
Figure 12:
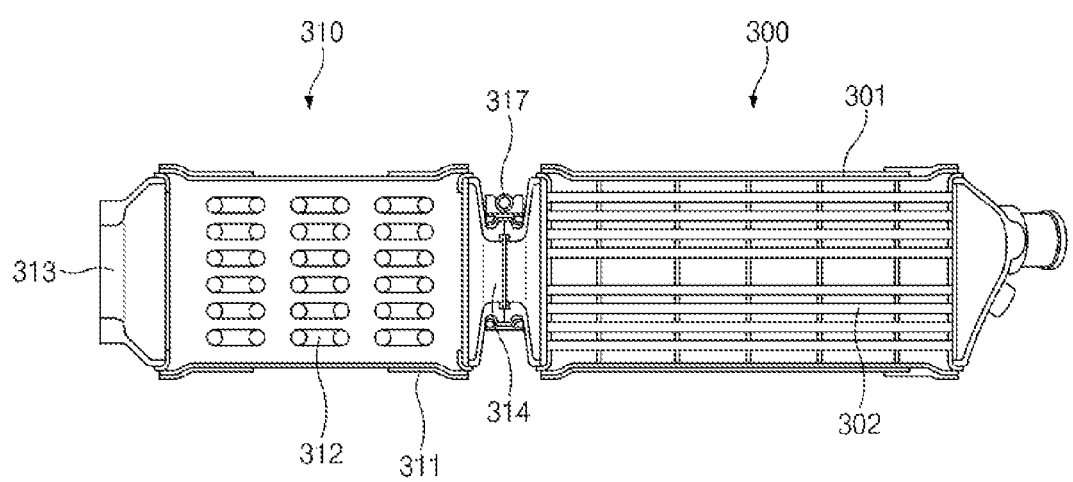
FIG. 12 is a cross-sectional view of the super heater and the EGR cooler of FIG. 11.

The super heater 310 is connected to the EGR cooler 300 so as to be separable from the EGR cooler, as illustrated in FIG. 11 and FIG. 12. In various embodiments of the present invention, the super heater 310, which is formed at one side of the EGR cooler 300 so as to recover the heat from the exhaust gas exhausted through the exhaust pipe 404 to heat the evaporated working fluid, is located upstream of the EGR cooler 300 in the main channel 100, and is connected to the EGR cooler 300 so as to be separable from the EGR cooler.

The supper heater 310 and the EGR cooler 300 are fastened to each other by a clamp 317 at connection portions therebetween, such that coupling therebetween is maintained. Thermal impact of the super heater 310 and the EGR cooler 300 is alleviated and damage to the super heater 310 and the EGR cooler 300 is prevented, through the clamp 317.

A separable super heater 310 mounted in the exhaust heat recovery system according to various embodiments of the present invention will be described in more detail below.

The exhaust heat recovery system according to various embodiments of the present invention includes the EGR line 200 cooling the exhaust gas exhausted from the engine 1 and circulating the cooled exhaust gas to the intake manifold, the turbine 340 rotated by the working fluid evaporated through heat exchange with the exhaust pipe 404 to generate energy, the super heater 310 disposed in the EGR line 200 and exchanging heat with the working fluid moving to the turbine 340, and the EGR cooler 300 formed to be separated from the super heater 310 and disposed in the EGR line 200 to exchange heat with the exhaust gas moving to the intake manifold.

The EGR cooler 300 includes an EGR cooler housing 301 forming an appearance, and the super heater 310 includes a super heater housing 311 forming an appearance, connected to the EGR cooler housing 301, and having super heater internal channels 312 formed therein.

A recirculation gas inlet 313 into which the exhaust gas is introduced from the exhaust gas recirculation (EGR) line 200 and a recirculation gas outlet 314 through which the exhaust gas is exhausted to the EGR cooler 300 are formed, respectively, at both ends of the super heater housing 311 in a length direction.

The super heater internal channels 312 protrude on a side surface of the super heater housing 311, and are provided with a super heater inlet 315 to which the working fluid is supplied and a super heater outlet 316 through which the working fluid is exhausted from the super heater internal channels 312. As described above, the turbine 340 receives the working fluid from the heat exchanger 400 or the super heater 310 to generate the electric power. The super heater inlet 315 is connected to the heat exchanger 400, and the super heater outlet 316 is connected to the turbine 340.

The EGR cooler 300 includes the EGR cooler housing 301 connected to the super heater housing 311 of the super heater 310, coolant channels 302 mounted in the EGR cooler housing 301, an EGR cooler inlet 303 protruding from the EGR cooler housing 301 and introducing a coolant into the coolant channels 302, and an EGR cooler outlet 304 protruding from the EGR cooler housing 301 and exhausting the coolant from the coolant channels 302.

Figure 13:
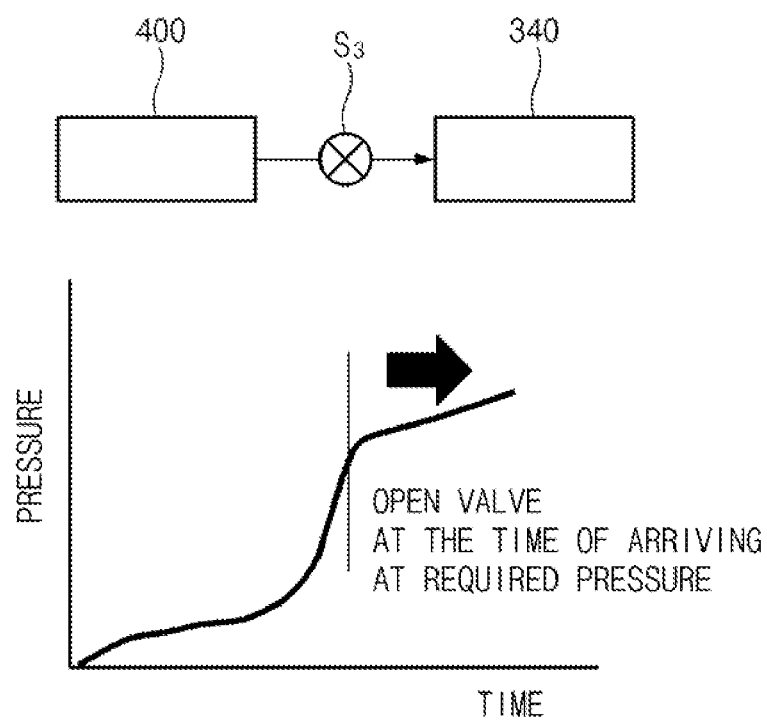
FIG. 13 is a graph illustrating a change in an internal pressure of the heat exchanger included in the exhaust heat recovery system of FIG. 1.
Figure 14:
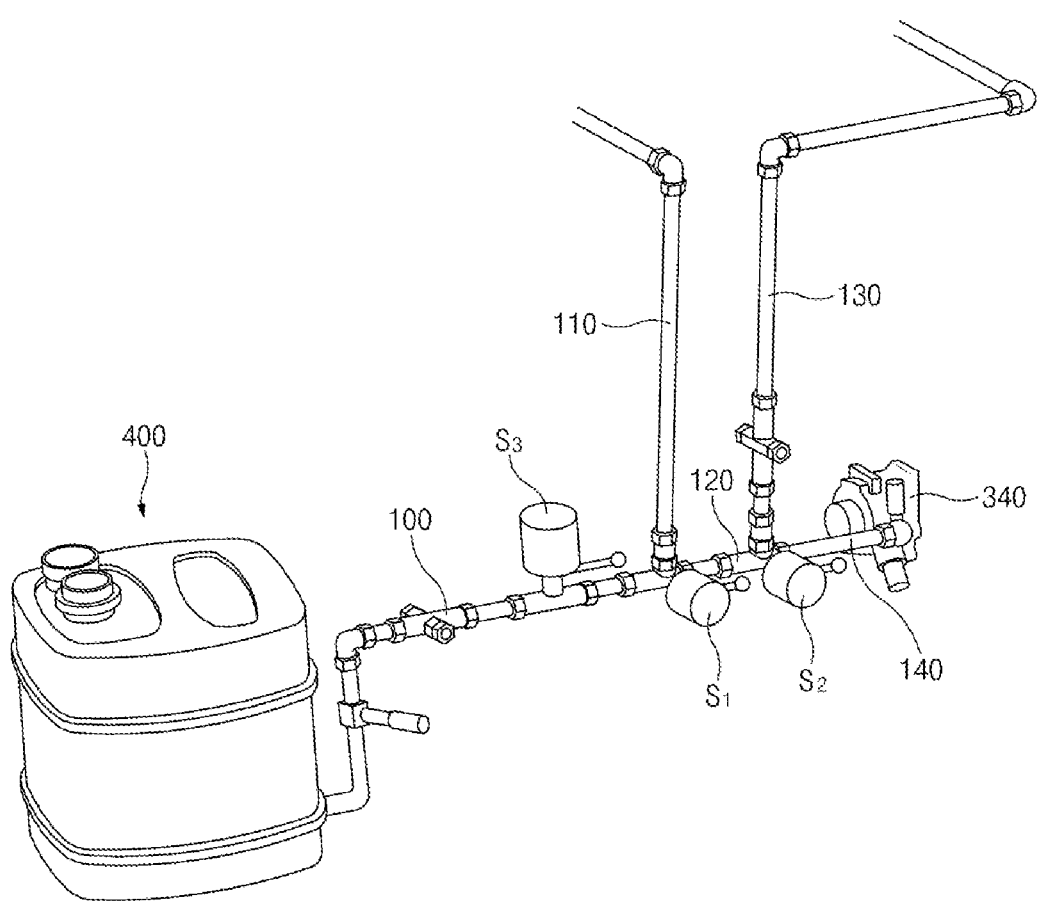
FIG. 14 is an illustrative view of a connection state between the heat exchanger and the turbine of the exhaust heat recovery system of FIG. 1.

Meanwhile, heat of the exhaust gas is lower at the early stage of the start-up than during driving, and the working fluid in the heat exchanger 400 is less evaporated at the early stage of the start-up than during driving. Therefore, at the early stage of the start-up, a pressure of the working fluid introduced into the turbine 340 is low, such that a low torque is generated in the turbine 340 by introduction of the working fluid. In consideration of this, a connection structure between the heat exchanger 400 and the turbine 340 of the exhaust heat recovery system according to various embodiments of the present invention includes the heat exchanger 400 provided in the exhaust pipe 404 and transferring the heat of the exhaust gas to the working fluid, the turbine 340 connected to the heat exchanger 400 through the main channel 100 and receiving the evaporated working fluid supplied through the main channel 100, and a pressure adjusting valve $S_3$ mounted in the main channel 100 and allowing the heat exchanger 400 and the turbine 340 to be in selective communication with each other, as illustrated in FIG. 13 and FIG. 14.

In addition, the connection structure further includes the reservoir 60 in which the liquid-phase working fluid is stored and the pump 70 pressurizing the working fluid and injecting the pressurized working fluid to the heat exchanger 400, and the working fluid is recovered from the turbine 340 to the reservoir 60. The recuperator 50 recovering the heat from the working fluid and the TEG condenser 370 are provided between the turbine 340 and the reservoir 60. The heat exchanger 400 has a pressure sensor mounted at an outlet thereof.

Figure 15:
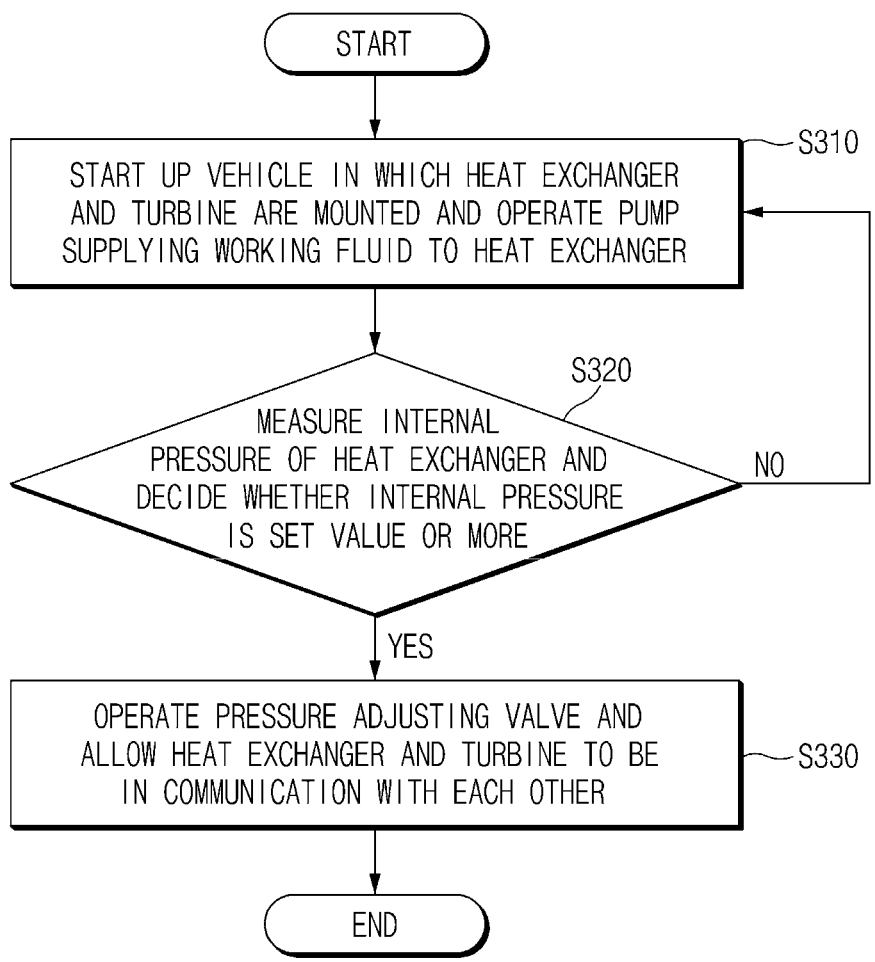
FIG. 15 is a procedure view of a method of controlling connection between the heat exchanger and the turbine of the exemplary exhaust heat recovery system according to the present invention.
Figure 16:
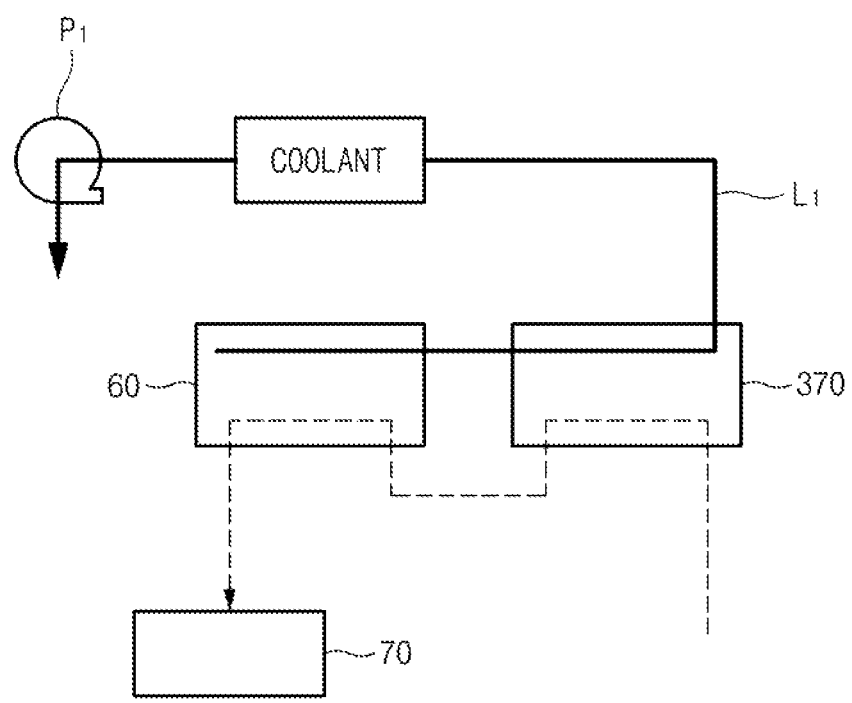
FIG. 16 is a schematic view of a structure in which a Thermoelectric Generator (TEG) condenser and a reservoir included in the exemplary exhaust heat recovery system of FIG. 1 share a coolant with each other.
Figure 17:
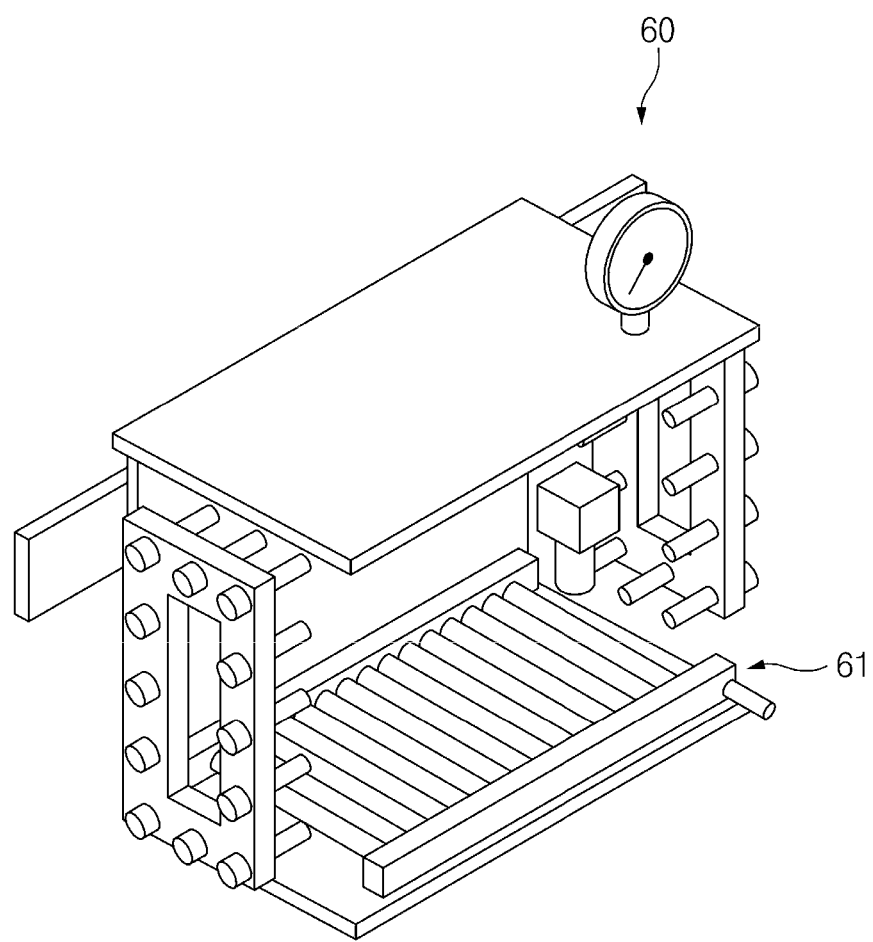
FIG. 17 is a perspective view of the reservoir of FIG. 16.
Figure 18:
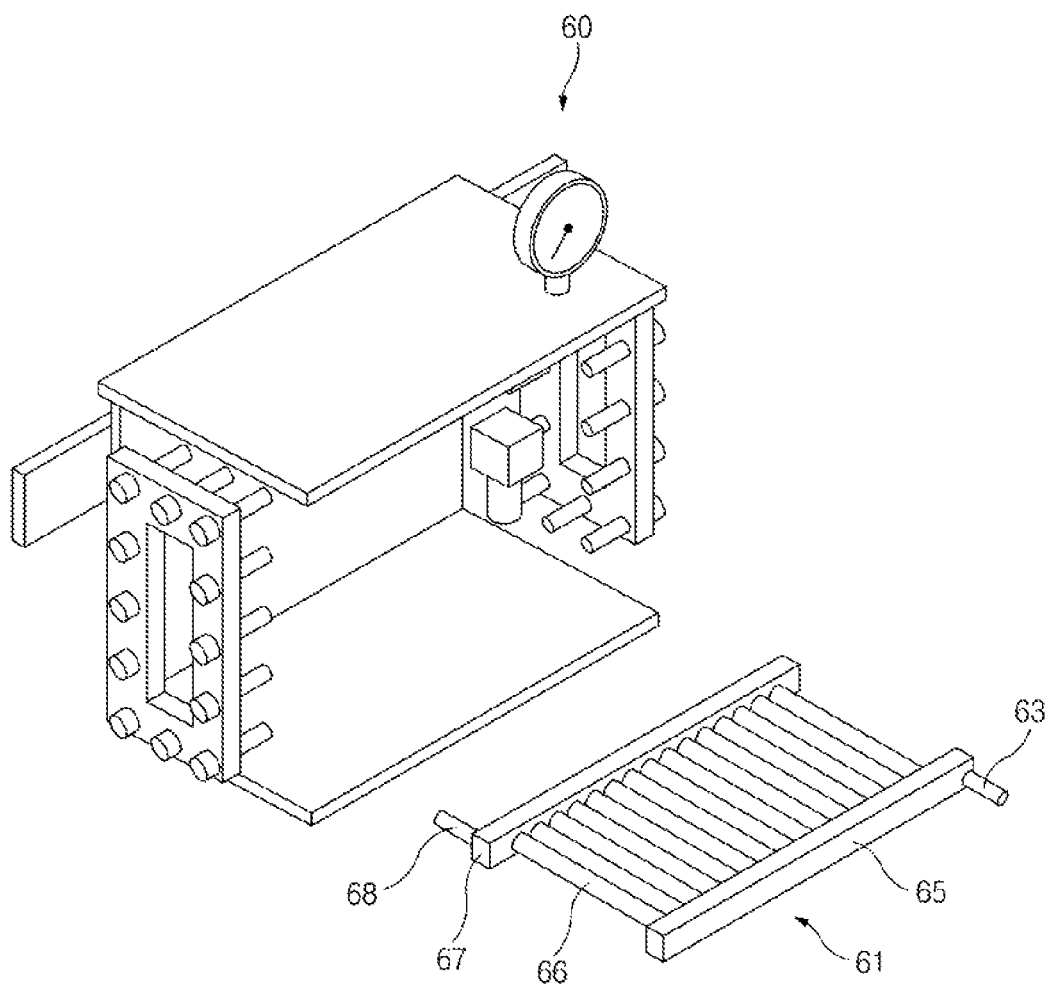
FIG. 18 is another perspective view of the reservoir of FIG. 16.
Figure 19:
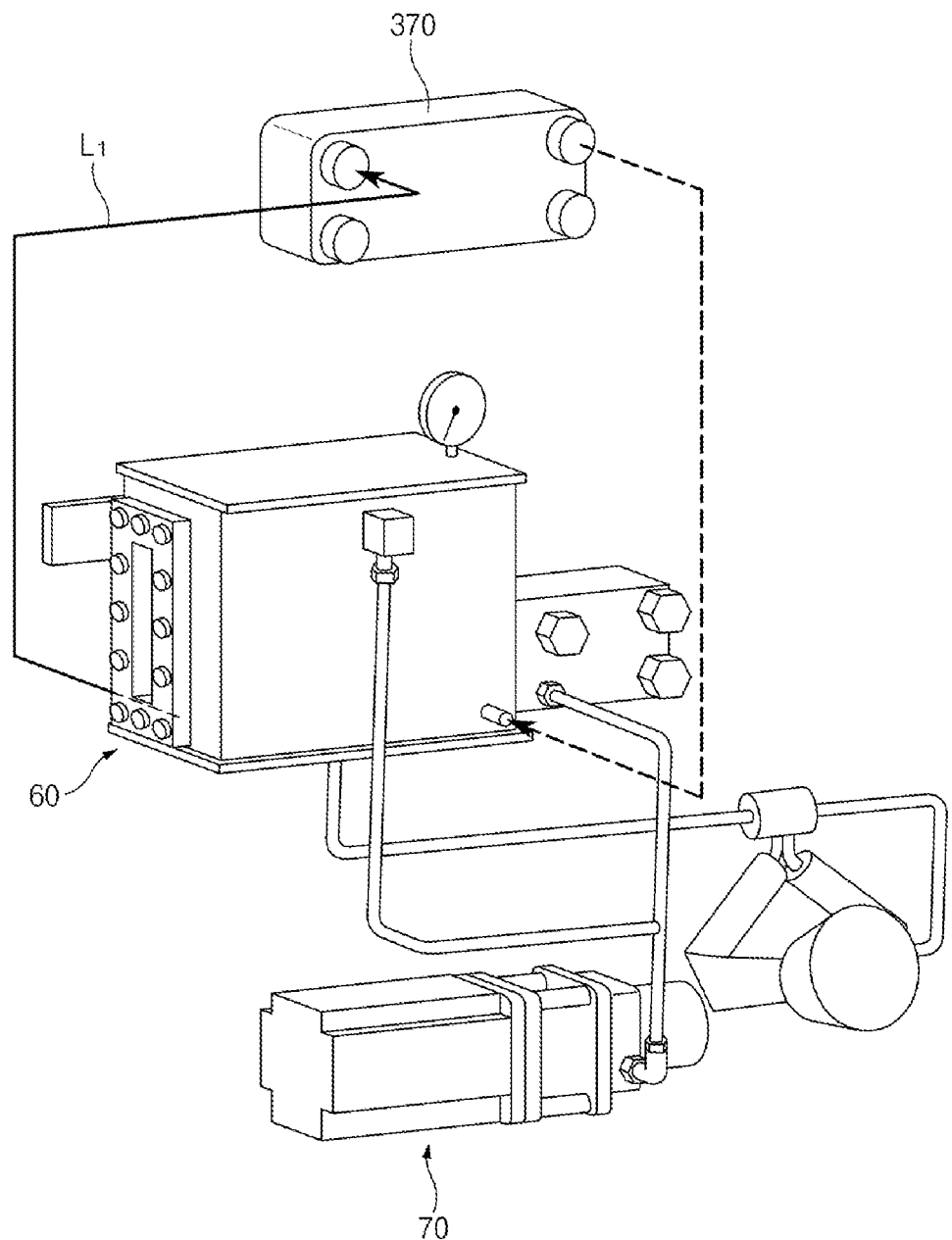
FIG. 19 is a perspective view of main parts of a connection structure between the TEG condenser and the reservoir of FIG. 16.

In the exhaust heat recovery system according to various embodiments of the present invention having the connection structure between the heat exchanger 400 and the turbine 340 as described above, as illustrated in FIG. 15, when an internal pressure of the heat exchanger 400 is a set value or more, the pressure adjusting valve $S_3$ is operated, and the heat exchanger 400 and the turbine 340 are in communication with each other (S330).

Before the internal pressure of the heat exchanger 400 is measured, the vehicle in which the heat exchanger 400 and the turbine 340 are mounted starts up, and the pump 70 supplying the working fluid to the heat exchanger 400 is operated (S310). The internal pressure of the heat exchanger 400 is measured, and it is decided whether the internal pressure is a set value or more (S320). The working fluid is circulated among the pump 70, the heat exchanger 400, and the turbine 340 through the pressure adjusting valve $S_3$.

The exhaust heat recovery system according to various embodiments of the present invention configured as described above will be described in more detail below.

When a temperature of the exhaust gas is low such as when the engine 1 initially starts up, re-circulated exhaust gas, that is, EGR gas does not pass through the EGR cooler 300, but is directly introduced into the intake manifold 2 using an EGR bypass valve 220, thereby making it possible to rapidly pre-heat the engine 1, and after a temperature of the exhaust gas is sufficiently raised, the exhaust gas is applied to the EGR cooler 300, thereby making it possible to decrease NOx.

The super heater 310 may be disposed upstream from the EGR cooler 300 based on a flow through which the EGR gas is introduced. In this case, the EGR gas may transfer a large amount of heat to the working fluid while passing through the super heater 310, and the EGR gas having an amount of heat that is not transferred to the working fluid is cooled by the EGR cooler 300, such that the working fluid may recover maximum heat from the EGR gas.

The working fluid is supplied to the pump 70 through an outlet 64 of the reservoir 60 storing the liquid-phase working fluid therein and having an inlet 62 and the outlet 64, and the working fluid pumped by the pump 70 is heated while passing through the recuperator 50.

The working fluid passing through the recuperator 50 is supplied to the heat exchanger 400 to again receive the heat, and receives the heat through the super heater 310 provided in the EGR cooler 300. The liquid-phase working fluid that is not evaporated even until passing through the super heater 310 is separated by a gas-liquid separator 330, and only the gas-phase working fluid passing through the super heater 310 is supplied to the turbine 340.

That is, the working fluid receives the heat from the recuperator 50, and the heat exchanger 400 is located upstream of the EGR cooler 300 in the main channel 100, such that the working fluid additionally receives the heat while sequentially passing through the heat exchanger 400 and the super heater 310.

The gas-phase working fluid is supplied to the turbine 340 to rotate the turbine 340, and the working fluid losing energy by rotating the turbine 340 passes through the recuperator 50 and then returns to the inlet 62 of the reservoir 60.

The working fluid circulated through the path as described above may satisfy a Rankine cycle condition. Here, a Rankine cycle, which is a cycle configured of two adiabatic changes and two isobaric changes, indicates a cycle in which the working fluid is accompanied by phase changes in vapor and liquid. Since the Rankine cycle is one of the well-known cycles, a detailed description therefor will be omitted.

The recuperator 50 is connected to both of the inlet 62 and the outlet 64 of the reservoir 60 to exchange heat between the working fluid introduced into the reservoir 60 and the working fluid flowing out from the reservoir 60.

In terms of the working fluid flowing out from the outlet 64 of the reservoir 60, the working fluid is heated by receiving heat from the working fluid passing through the turbine 340 and then introduced into the recuperator 50. To the contrary, in terms of the working fluid passing through the turbine 340 and then introduced into the recuperator 50, the working fluid is cooled by the working fluid flowing out from the outlet 64 of the reservoir 60. As described above, the recuperator 50 is disposed upstream from the reservoir 60 based on the inlet 62 of the reservoir 60 and is disposed downstream from the reservoir 60 based on the outlet 64 of the reservoir 60, thereby making it possible to allow the working fluid to be stably supplied in the liquid phase to the reservoir 60 and preheat the working fluid before being supplied to the heat exchanger 400 to improve efficiency of exhaust heat recovery.

The TEG condenser 370 is disposed between the inlet 62 of the reservoir 60 and the recuperator 50 and performs a predetermined role in robbing an amount of heat from the working fluid to make the working fluid flowing in the reservoir 60 a liquid state. In addition, a pipe between the recuperator 50 and the TEG condenser 370 may be formed of a working fluid radiator bent plural times in order to improve cooling efficiency. The working fluid radiator may be cooled by a cooling fan 360.

An end portion of the working fluid radiator is connected to the TEG condenser 370, such that the working fluid cooled by the working fluid radiator and the cooling fan 360 may be additionally cooled by the TEG condenser 370.

Meanwhile, the pump 70 is disposed between the reservoir 60 and the recuperator 50, and in the case in which the working fluid flowing through a pipe connecting the reservoir 60 and the pump 70 to each other absorbs heat from the surrounding to thereby be evaporated, pumping efficiency may be decreased. In order to prevent the decrease in the pumping efficiency as described above, the pipe connecting the reservoir 60 and the pump 70 to each other may be subjected to heat insulation treatment.

In the main channel 100, a point between the super heater 310 and the turbine 340 and a point between the turbine 340 and the recuperator 50 are connected to each other by a working fluid bypass 350, and a working fluid bypass valve 352 selectively bypassing the working fluid to the recuperator 50 is installed in the working fluid bypass 350.

In the case in which the working fluid exceeds a specific temperature and pressure, a molecule structure of the working fluid is destroyed, such that a unique material property of the working fluid may be lost. In the case in which the unique material property of the working fluid may be lost as described above, the working fluid is supplied to the recuperator 50 using the working fluid bypass valve 352 in order to again make the working fluid a normal state before the working fluid passes through the turbine 340. The working fluid bypassed to the recuperator 50 returns to the normal state while passing through the recuperator 50.

It is ideal that only the working fluid is circulated in the main channel 100. However, a high temperature working fluid needs to rotate the turbine 340, and the turbine 340 is lubricated by a turbine lubricant in order to prevent the turbine 340 from being damaged while being rotated at a high speed. Therefore, the turbine lubricant may be mixed with the working fluid passing through the turbine 340, and an oil separator 320 for separating fluids other than the working fluid, including the turbine lubricant exhausted from the turbine 340 from the main channel 100 may be formed in a pipe between the turbine 340 and the recuperator 50.

Meanwhile, the TEG condenser 370 and the reservoir 60 are provided with a coolant channel $L_1$ through which a coolant for cooling the working fluid flows and a coolant pump $P_1$ supplying motive power for circulating the coolant through the coolant channel $L_1$, respectively. Therefore, a layout design of a pipe connected to the TEG condenser 370 and the reservoir 60 is significantly difficult.

In consideration of this, in the exhaust heat recovery system according to various embodiments of the present invention, as illustrated in FIG. 16 to FIG. 19, the TEG condenser 370 and the reservoir 60 are configured to share the coolant with each other.

The exhaust heat recovery system according to various embodiments of the present invention includes the TEG condenser 370 and the reservoir 60 to which the coolant channel $L_1$ through which the coolant for cooling the working fluid receiving the heat of the exhaust gas flows is extended. In addition, the coolant channel $L_1$ is provided with the coolant pump $P_1$ for circulating the coolant.

A detailed description therefor will be provided below. As illustrated in FIGS. 16 to 19, the exhaust heat recovery system according to various embodiments of the present invention includes the TEG condenser 370 having the working fluid introduced thereinto and recovering the heat of the introduced working fluid, the working fluid receiving the heat of the exhaust gas through the heat exchanger 400 provided in the exhaust pipe 404, and the reservoir 60 receiving the working fluid from the TEG condenser 370, wherein the TEG condenser 370 and the reservoir 60 are provided with the coolant channel $L_1$ through which the coolant for cooling the working fluid flows.

The coolant channel $L_1$ is mounted with the coolant pump $P_1$ so that the coolant may be circulated in the TEG condenser 370 and the reservoir 60 through the coolant channel $L_1$. The reservoir 60 includes a cooling jacket 61 mounted in the reservoir 60 and provided with a cooling jacket inlet 63 and a cooling jacket outlet 68 connected to the coolant channel $L_1$.

The cooling jacket 61 includes a coolant introduction chamber 65 having the cooling jacket inlet formed therein, a coolant exhaust chamber 67 disposed in parallel with the coolant introduction chamber 65 and having the cooling jacket outlet 68 formed therein, and a plurality of cooling jacket internal paths 66 connecting the coolant introduction chamber 65 and the coolant exhaust chamber 67 to each other. The cooling jacket internal paths 66 are formed perpendicularly to the coolant introduction chamber 65 and the coolant exhaust chamber 67.

Meanwhile, the reservoir 60 is connected to the pump 70 pressurizing the working fluid and supplying the pressurized working fluid to the heat exchanger 400. The heat exchanger 400 is connected to the super heater 310 receiving and heating the evaporated working fluid. The super heater 310 is attached to a front end of the EGR cooler 300 cooling the re-circulated exhaust gas.

The TEG condenser 370 is connected to the turbine 340 receiving the working fluid from the heat exchanger 400. The recuperator 50 transferring the heat of the working fluid introduced from the turbine 340 into the TEG condenser 370 to the working fluid introduced from the TEG condenser 370 to the reservoir 60 is provided between the turbine 340 and the TEG condenser 370.

Meanwhile, as a working load of the turbine 340 becomes large, an internal temperature of the reservoir 60 rises. As the internal temperature of the reservoir 60 rises, a temperature of the working fluid accommodated in the reservoir 60 rises, such that an evaporation phenomenon that the working fluid is changed from the liquid state into the gas phase occurs in the reservoir 60. Since the working fluid is changed from the liquid state into the gas phase, a state in which the pump 70 pressurizing the liquid-phase fluid and supplying the pressurized liquid-phase fluid to the heat exchanger 400 may not be operated occurs, such that a state in which the liquid-phase working fluid may not be supplied to the heat exchanger 400 ultimately occurs.

Figure 20:
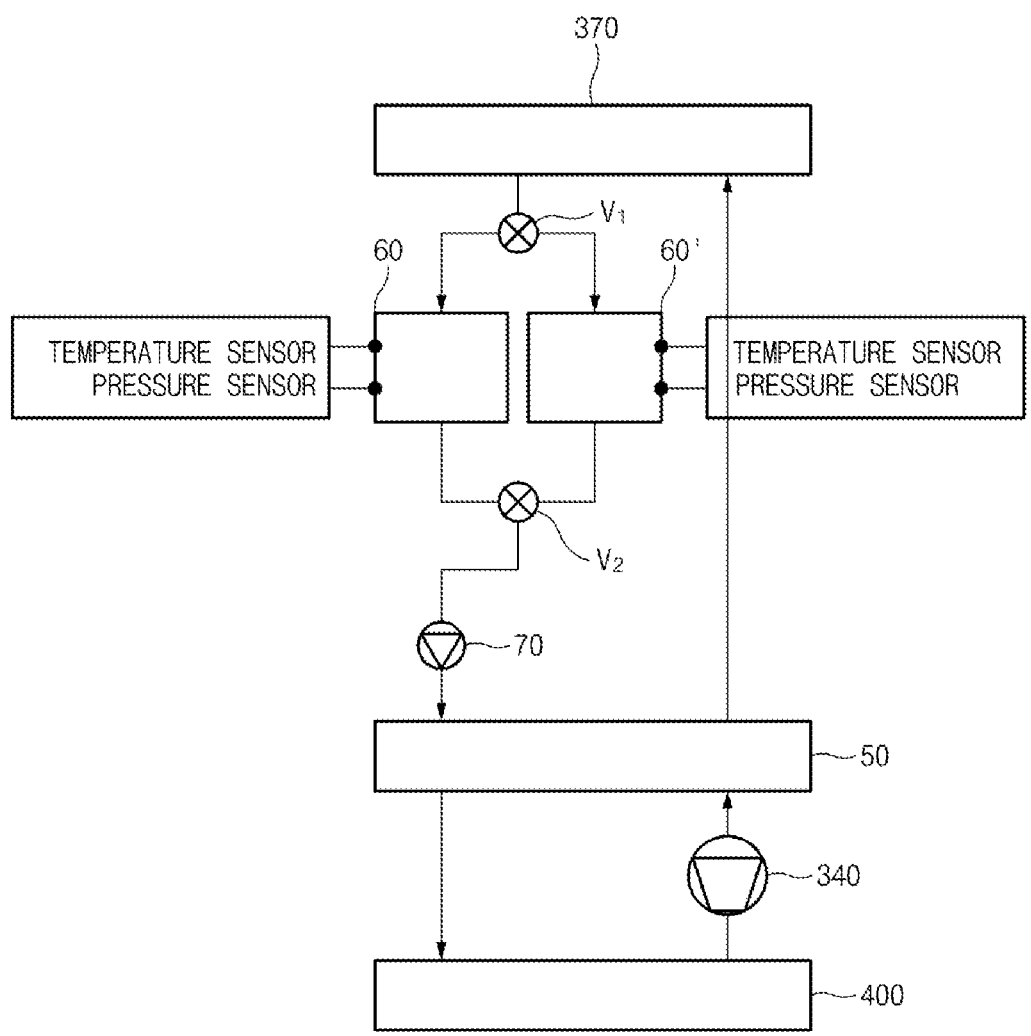
FIG. 20 is a schematic view of a reservoir tank of the exhaust heat recovery system illustrated in FIG. 1.

In consideration of this, in the exhaust heat recovery system according to various embodiments of the present invention, as illustrated in FIG. 20, a plurality of reservoirs 60, 60' are provided, and only reservoirs 60 of which internal temperatures are less than a specific value among the plurality of reservoirs 60, 60' are in communication with the heat exchanger 400 so as to supply the working fluids to the heat exchanger 400 through the pump 70.

The exhaust heat recovery system according to various embodiments of the present invention includes the exhaust pipe 404 through which the exhaust gas exhausted from the engine 1 moves, the heat exchanger 400 mounted in the exhaust pipe 404 and inducing the heat exchange between the exhaust gas and the working fluid flowing therein, the plurality of reservoirs 60, 60' supplying the working fluids to the heat exchanger 400, and channel adjusting valves $V_1$ and $V_2$ allowing any one of the plurality of reservoirs 60, 60' to be in communication with the heat exchanger 400.

In addition, the exhaust heat recovery system according to various embodiments of the present invention further includes the pump 70 pressurizing the working fluids from the plurality of reservoirs 60, 60' and supplying the pressurized working fluids to the heat exchanger 400, the turbine 340 receiving the evaporated working fluid from the heat exchanger 400 to generate the electric power, and the TEG condenser 370 receiving the working fluid from the turbine 340 to recover the heat of the working fluid.

The channel adjusting valves $V_1$ and $V_2$ include a first channel adjust valve $V_1$ provided in a first connection channel connecting a TEG condenser outlet through which the liquid-phase working fluid is exhausted from the TEG condenser 370 and the plurality of reservoirs 60, 60' to each other and a second channel adjusting valve $V_2$ provided in a second connection channel connecting the plurality of reservoirs 60, 60' and the pump 70 to each other.

Each of the reservoirs 60, 60' is provided with a temperature sensor and a pressure sensor. The exhaust heat recovery system according to various embodiments of the present invention further includes the heat exchanger 400 receiving the working fluid pressurized and supplied through the pump 70 and the turbine 340 receiving the working fluid from the heat exchanger 400 to generate the electric power and transferring the working fluid to the TEG condenser 370. The exhaust heat recovery system according to various embodiments of the present invention further includes the recuperator 50 allowing the heat of the working fluid transferred from the turbine 340 to the TEG condenser 370 to be transferred to the working fluids supplied from the plurality of reservoirs 60, 60' to the heat exchanger 400.

The recuperator 50 is mounted between a supply pipe connecting the pump 70 and the heat exchanger to each other and a recovery pipe connecting the turbine 340 and the TEG condenser 370 to each other.

Figure 21:
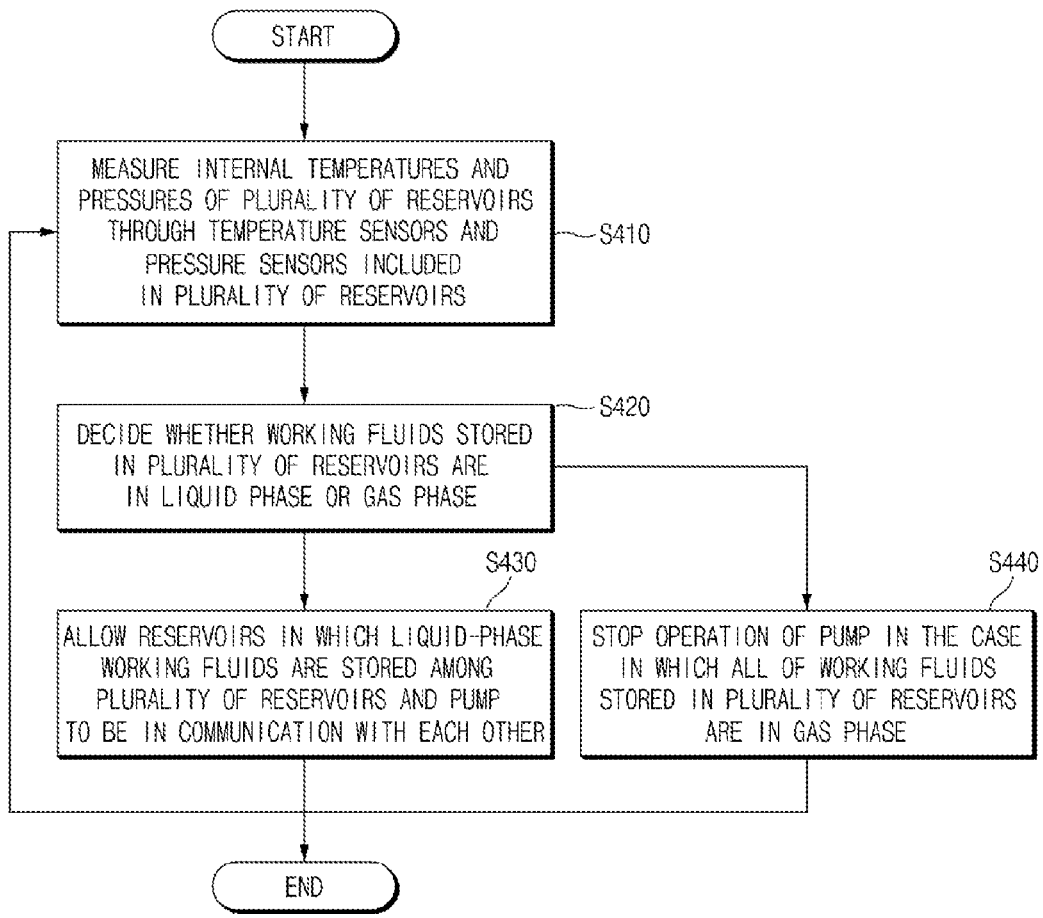
FIG. 21 is a procedure view of a method of operating the reservoir tank of the exemplary exhaust heat recovery system according to the present invention.

As illustrated in FIG. 21, a method of operating the reservoir tank of the exhaust heat recovery system according to various embodiments of the present invention configured as described above includes measuring internal temperatures and pressures of the plurality of reservoirs 60, 60' through the temperature sensors and the pressure sensors included in the plurality of reservoirs 60 (S410), deciding whether the working fluids stored in the plurality of reservoirs 60, 60' are in the liquid phase or the gas phase (S420), and allowing reservoirs 60 in which the liquid-phase working fluids are stored among the plurality of reservoirs 60, 60' and the pump 70 to be in communication with each other (S430).

In the case in which all of the working fluids stored in the plurality of reservoirs 60, 60' are in the gas phase, an operation of the pump 70 is stopped (S440). When the number of reservoirs 60 in which the liquid-phase working fluids are stored among the plurality of reservoirs 60, 60' is two or more, any one reservoir 60 set among the plurality of reservoirs 60, 60' and the pump 70 are in communication with each other.

At the time of the initial start-up, any one reservoir 60 set among the plurality of reservoirs 60, 60' and the pump 70 are in communication with each other.

As described above, with the exhaust heat recovery system according to various embodiments of the present invention, exhaust heat may be recovered without decreasing an output of an internal combustion engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust heat recovery system comprising:
   an exhaust pipe through which exhaust gas exhausted from an engine moves;
   a main channel through which a working fluid moves;
   a turbine rotated by the working fluid exhausted from the main channel to generate energy;
   an exhaust gas recirculation (EGR) line circulating a portion of the exhaust gas exhausted from the engine to an intake manifold;
   channel control valves disposed in the main channel and configured to control movement of the working fluid so that the exhaust gas moving along the EGR line and the working fluid moving along the main channel exchange heat with each other;
   a reservoir storing a liquid-phase working fluid therein;
   a heat exchanger provided in the exhaust pipe so as to receive the liquid-phase working fluid from the reservoir and evaporate the liquid-state working fluid; and
   a super heater connected to an EGR cooler so as to receive the evaporated working fluid from the heat exchanger depending on operations of the channel control valves and transferring heat of the exhaust gas circulated to the intake manifold to the evaporated working fluid to heat the evaporated working fluid,
   wherein the main channel is branched into a first branch channel connected to a super heater inlet formed in the super heater and a second branch channel extended toward the turbine, and
   wherein the second branch channel is branched into a third branch channel connected to a super heater outlet formed in the super heater and a fourth branch channel connected to a turbine inlet formed in the turbine.

2. The exhaust heat recovery system according to claim 1, wherein the working fluid supplied from the reservoir to the heat exchanger is pressurized through a pump.

3. The exhaust heat recovery system according to claim 1, wherein the turbine selectively receives the working fluid from the heat exchanger or the super heater depending on the operations of the channel control valves.

4. The exhaust heat recovery system according to claim 1, wherein the channel control valves are provided at a first branch point at which the main channel is branched into the first branch channel and the second branch channel and a second branch point at which the second branch channel is branched into the third branch channel and the fourth branch channel, respectively.

5. The exhaust heat recovery system according to claim 1, wherein the channel control valves include:
   a first channel control valve provided at a first branch point at which the main channel is branched into the first branch channel and the second branch channel; and
   a second channel control valve provided at a second branch point at which the second branch channel is branched into the third branch channel and the fourth branch channel.

6. The exhaust heat recovery system according to claim 1, further comprising:
   a condenser configured to condense the working fluid exhausted from the turbine; and
   a recuperator configured to absorb thermal energy from the working fluid moving from the turbine to the condenser and transfer the thermal energy to the working fluid injected from the reservoir to the heat exchanger.

* * * * *